Aug. 6, 1946.    D. L. HILL    2,405,503
CULTIVATING IMPLEMENT
Filed Aug. 29, 1944

DUDLEY L. HILL
INVENTOR

BY John P. WKonon
ATTORNEY

Patented Aug. 6, 1946

2,405,503

UNITED STATES PATENT OFFICE 2,405,503

CULTIVATING IMPLEMENT

Dudley L. Hill, Peekskill, N. Y.

Application August 29, 1944, Serial No. 551,664

2 Claims. (Cl. 97—60)

My invention relates to cultivating implements and has particular reference to implements for destroying weeds around a plant without harming the plant itself.

This is continuation in part of my application Serial No. 521,925, filed February 11, 1944.

My invention has for its object to provide an implement which can be used for undercutting the roots of weeds around a plant, leaving a circular area at the plant untouched where the roots of the plant are located, and effectively destroying the weeds which otherwise would interfere with the normal growth of the plant.

Another object of my invention is to provide a cultivating implement having rotary knives for undercutting the roots of the weeds around the plant, the knives being so constructed as to penetrate the soil to a certain depth thereby loosening the upper layer of the soil for facilitating the absorption of air and moisture.

Another object of my invention is to provide the cutting knives for the weeds of such a shape that the knives, while working on a relatively large area around the plant, will be easy to operate, each knife having gradually receding portions toward the periphery so that different portions of the knife will successively engage the soil, thereby avoiding an excessively large torque or force which would be required if all the portions of the knife began their cutting action at the same time.

Another object of my invention is to provide weed-cutting knives on my implement of such a shape that they will cut and loosen the top soil around the plant and will form a funnel-shaped bed under the loosened soil, thereby facilitating the movement of the rain water toward the centrally located roots of the cultivated plant.

Still another object of my invention is to provide a cultivating implement in which the cutting knives can be worked into the top soil around the plant to a predetermined depth, upon reaching which the rotation of the knives may continue without any further deepening of the cut.

Still another object of my invention is to provide a supporting frame for the shaft, carrying the cutting knives, the frame being adapted to be immovably supported on the ground above the plant to be cultivated while the shaft with the knives is manually rotated.

My invention is more fully described in the accompanying specification and drawing in which—

Figure 1:
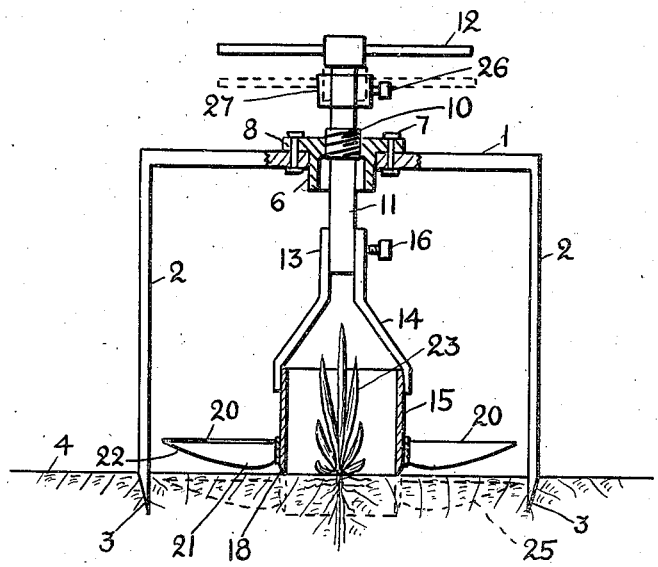
Fig. 1 is a sectional elevational view of my cultivating implement at the beginning of its operation, the final operative position being shown in dotted lines.
Figure 2:
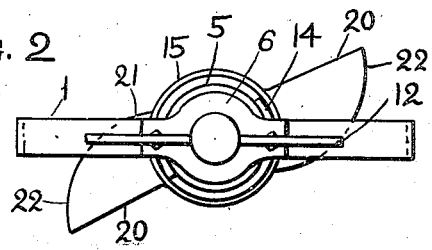
Fig. 2 is a top plan view of the same.

My cultivating implement as shown in Figs. 1 and 2 comprises a yoke having a horizontal or bight member 1 and legs 2 with sharp ends 3 for insertion into a ground 4. The upper horizontal member is provided with a central enlarged portion 5 with a hole for a bearing 6 secured to the member 1 by bolts 7. The bearing is threaded in its upper portion at 8 for a threaded enlargement 10 on a shaft 11. The latter is provided with a handle or handle bars 12 at the top for its manual rotation. The lower end of the shaft is relatively short and is adapted for removably supporting a bushing or sleeve 13 with arms 14 attached to the upper edge of a tubular member 15. A screw 16 is threaded into the bushing 13 for locking the same on the shaft 11.

The lower edge of the tubular member 15 is tapered to a sharp edge at 18 so that it can be forced into the soil under pressure. Cutting blades or knives 20 are attached to the sides of the tubular member at a small elevation above the lower sharp edge 18. The blades are inclined downward at their cutting edges in the same direction in which the threads on the shaft are made, preferably for the right hand or clockwise rotation, looking at the blades from the top. The blades therefore will gradually sink into the soil when the shaft is rotated. To facilitate the soil cutting operation, the blades are so shaped that the inner cutting portions 21 are below the outer portions 22 and, besides, the inner portions are advanced ahead of the outer or peripheral portions. Different portions of the blades, therefore, will enter the soil at different times so that the force for rotating the shaft will be materially reduced.

For operating the implement, the yoke is placed on the ground with the tubular member 15 enclosing a plant 23. Different tubular members may be fastened to the shaft by the screw 16, depending on the size of the plant. The sharp points 3 of the yoke are forced into the ground until the sharp edge 18 also enters the ground. The blades 20 will be then just above the ground. The handle 12 is then rotated in a correct direction, causing the threaded portion 10 of the shaft to be screwed into the bearing 6, thereby advancing the blades downward into the soil. The downward movement of the blades will continue until the threaded portion 10 finally leaves the threaded portion of the bearing. The rotation can be then continued without advancing the blades any further. The blades will merely churn the top layer of the soil above a funnel-shaped depression 25. To remove the blades, the shaft can be turned in the opposite direction, causing the threaded portion 10 to be screwed into the threaded portion of the bearing 6.

It should be noted that the funnel-shaped depression is very beneficial to the plant because the downward sloping sides of the depression will direct rain water toward the roots of the plant 23.

The depth of the penetration of the blades 20 into the soil can be adjusted by releasing a locking screw 26 in a collar or bushing 27, moving the collar to a new position, and again tightening the screw 26.

The sharp edges 18 of the tubular member 15, by penetrating into the soil, will also cut such roots of the surrounding weeds which may extend into the area around the plant and within the periphery of the tubular member.

What is claimed as new and desired to be secured by Letters Patent is:

1. A cultivating implement comprising a shaft; means to support the shaft for rotation in a vertical position; a tubular member open at both ends adjustably supported at the lower end of the shaft; blades extending outwards from the lower portion of the tubular member and having cutting edges inclined downwards in a direction of their movement when the shaft is rotated in a corresponding direction, the upper edges of the blades being substantially in the same plane, the tubular member being arranged to be placed on the ground around a plant to be cultivated; and threaded engagement between the shaft and the supporting means to move the shaft axially in response to its rotation.

2. A cultivating implement comprising a shaft; means to support the shaft for rotation in a vertical position; a tubular member supported at the lower end of the shaft open at both ends; blades extending outwards from the lower portion of the member and having cutting edges inclined downwards in a direction of their movement when the shaft is rotated in a corresponding direction, the member being arranged to be placed on the ground around a plant to be cultivated; an enlarged portion on the shaft in threaded engagement with the supporting means; and smooth portions on the shaft at either side of the enlarged portion for allowing free rotation of the shaft when the enlarged portion leaves the threaded engagement with the supporting means; and sharp-pointed prongs on the supporting means for engaging the ground at the sides of the plant.

DUDLEY L. HILL.